(12) United States Patent
Damaggio

(10) Patent No.: US 11,997,438 B2
(45) Date of Patent: *May 28, 2024

(54) DECLARATIVE IOT DATA CONTROL

(71) Applicant: Microsoft Technology Licensing, LLC, Redmond, WA (US)

(72) Inventor: Elio Damaggio, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1 day.

This patent is subject to a terminal disclaimer.

(21) Appl. No.: 17/341,253

(22) Filed: Jun. 7, 2021

(65) Prior Publication Data
US 2021/0345020 A1 Nov. 4, 2021

Related U.S. Application Data

(63) Continuation of application No. 15/434,995, filed on Feb. 16, 2017, now Pat. No. 11,039,225.

(60) Provisional application No. 62/434,888, filed on Dec. 15, 2016.

(51) Int. Cl.
| | |
|---|---|
| *H04L 41/0813* | (2022.01) |
| *G06F 16/22* | (2019.01) |
| *G16Y 40/30* | (2020.01) |
| *H04L 41/0806* | (2022.01) |
| *H04L 67/125* | (2022.01) |
| *H04L 67/565* | (2022.05) |
| *H04Q 9/00* | (2006.01) |

(52) U.S. Cl.
CPC ........... *H04Q 9/00* (2013.01); *G06F 16/2228* (2019.01); *G16Y 40/30* (2020.01); *H04L 41/0813* (2013.01); *H04L 67/125* (2013.01); *H04L 67/565* (2022.05); *H04L 41/0806* (2013.01); *H04Q 2209/40* (2013.01)

(58) Field of Classification Search
CPC ........ G16Y 40/00; G16Y 40/30; G16Y 40/35; G16Y 20/00; G16Y 20/20; H04L 41/0803; H04L 41/0806; H04L 41/0813
See application file for complete search history.

(56) References Cited

U.S. PATENT DOCUMENTS

| | | | |
|---|---|---|---|
| 10,152,357 B1* | 12/2018 | Espy | G06F 11/3051 |
| 2014/0241354 A1* | 8/2014 | Shuman | H04L 12/2803 370/390 |
| 2016/0295616 A1* | 10/2016 | Zakaria | H04W 12/041 |
| 2017/0187807 A1* | 6/2017 | Clernon | H04L 67/34 |
| 2019/0028545 A1* | 1/2019 | Yang | H04W 4/70 |

* cited by examiner

*Primary Examiner* — Jason D Recek

(57) ABSTRACT

The disclosed technology is generally directed to communications in an IoT environment. For example, such technology is usable for IoT data control. In one example of the technology, a declarative data request is received. The declarative data request is a request for data from multiple IoT devices. The declarative data request is translated into a plurality of individual requests. Destination IoT devices associated with the plurality of individual requests are identified. The plurality of individual requests to the destination IoT devices are sent. IoT data is received from the destination IoT devices based on the plurality of individual requests. The declarative data request is responded to based on the received IoT data.

20 Claims, 5 Drawing Sheets

DECLARATIVE IOT DATA CONTROL

CROSS-REFERENCE TO RELATED APPLICATION(S)

This application is a continuation of U.S. patent application Ser. No. 15/434,995, filed Feb. 16, 2017, entitled "DECLARATIVE IOT DATA CONTROL", which claims priority to U.S. Provisional Pat. App. No. 62/434,888, filed Dec. 15, 2016, entitled "DECLARATIVE IOT DATA CONTROL". The entirety of each of these afore-mentioned applications is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The devices can also include sensors in buildings and factory machines, sensors and actuators in remote industrial systems, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to communications in an IoT environment. For example, such technology is usable for IoT data control. In one example of the technology, a declarative data request is received. The declarative data request is a request for data from multiple IoT devices. The declarative data request is translated into a plurality of individual requests. Destination IoT devices associated with the plurality of individual requests are identified. The plurality of individual requests to the destination IoT devices are sent. IoT data is received from the destination IoT devices based on the plurality of individual requests. The declarative data request is responded to based on the received IoT data.

Examples of the disclosure provide on-demand telemetry via a declarative IoT telemetry request. Examples of the disclosure decouple IoT device applications from IoT solution back-ends, for example, with respect to management of telemetry data. In this way, via declarative IoT telemetry requests, the IoT devices may be used, so that, in some examples, the application back-end does not require different solution-specific code or alteration of functional design depending on the type of IoT data being requested-instead, the request from the application back-end may be decoupled from the manner in which the request is answered.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
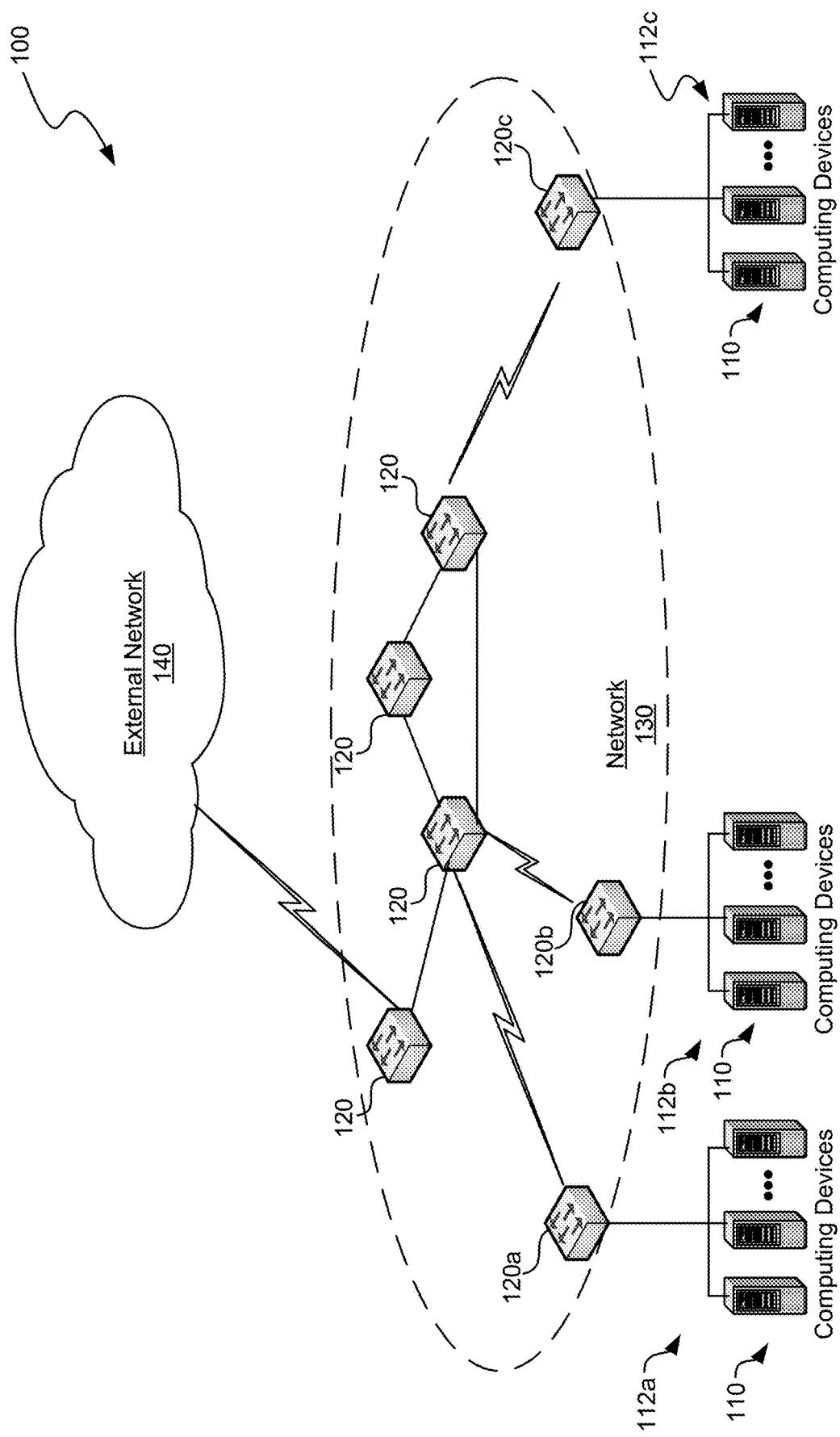
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. IoT data refers to data collected by and/or stored in IoT devices, including telemetry data and other types of data. A declarative request or declarative query is a request or query that is referentially transparent, meaning that the request is unchanged irrespective of whether any term used in the request is a reference or an actual value that the reference is pointing to. In essence, a declarative query specifies what information is being requested but does not specify how the query is to be answered.

Briefly stated, the disclosed technology is generally directed to communications in an IoT environment. For example, such technology is usable for IoT data control. In one example of the technology, a declarative data request is received. The declarative data request is a request for data from multiple IoT devices. The declarative data request is translated into a plurality of individual requests. Destination IoT devices associated with the plurality of individual requests are identified. The plurality of individual requests to the destination IoT devices are sent. IoT data is received from the destination IoT devices based on the plurality of individual requests. The declarative data request is responded to based on the received IoT data.

Examples of the disclosure decouple IoT device applications from IoT solution back-ends, for example, with respect to management of telemetry data. In this way, via declarative IoT requests, the IoT devices may be used, so that, in some examples, the IoT device code does not require functional changes, application back-end does not require different solution-specific code or alteration of functional design, and/or the like, depending on the type of IoT data being requested. Instead, the request from the application back-end may be de-coupled from the manner in which the request is answered. Examples of the disclosure provide on-demand telemetry via a declarative IoT telemetry request. An IoT telemetry request can be made and responded to as if all the device telemetry from all of the IoT devices are available, as if all of the IoT devices were part of a large distributed database, even if the IoT devices include heterogeneous sets of devices, consisting of different devices, or different revisions or configurations of the same class of devices, including different firmware and/or software on IoT devices.

Via declarative IoT control, the IoT devices may send telemetry to the cloud with no special buffering and/or batching being considered by device applications. Device applications may expose all available telemetry streams without considering the back-end of the IoT solution. The cloud back-end may dynamically query the requested telemetry data with corresponding frequency of sending telemetry data, normalization definition, and destination component. In some examples, the application code on the IoT devices does not have to handle buffering/configuration logic, and require no changes if the solution's back-end requests different telemetry streams and/or different frequencies of sending telemetry data. Instead, in some examples, a service component may take responsibility for answering individual telemetry requests, and for handling requested buffering/frequency matters. In such examples, the rest of the device (including application code) may be unconcerned with buffering/frequency matters and can simply expose the telemetry data to the component service.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a gateway device, a device that comprises part or all of an IoT hub, a device comprising part or all of an application back-end, or the like, as discussed in greater detail below.

Illustrative Computing Device

Figure 2:
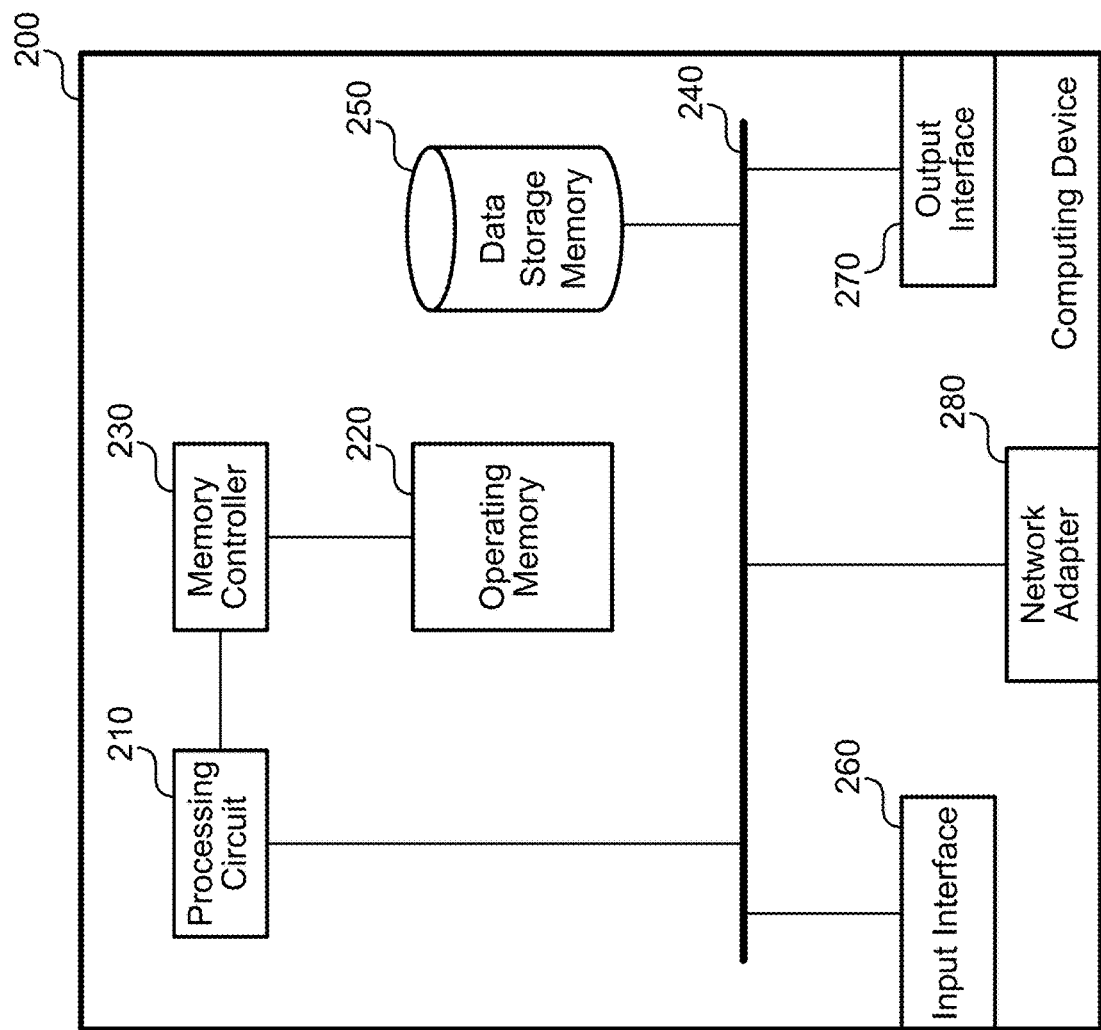
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions. In some examples, computing device 200 is enabled to perform actions such as the actions in the process of FIG. 4 below, or actions in a process performed by one or more of the computing devices in FIG. 3 or FIG. 5 below.

Illustrative Systems

Figure 3:
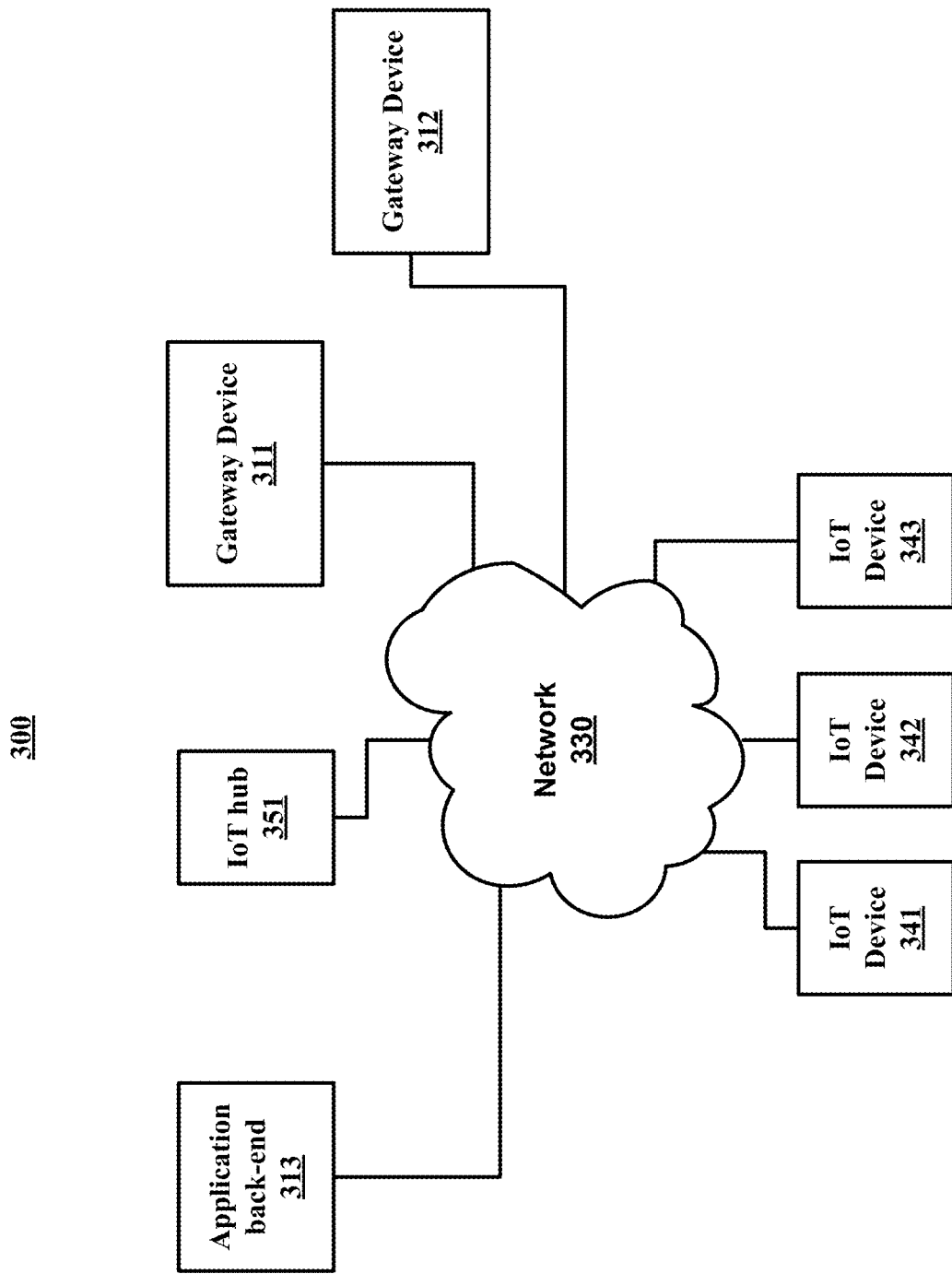
FIG. 3 is a block diagram illustrating an example of a system for IoT data control.

FIG. 3 is a block diagram illustrating an example of a system (300) for IoT data control. System 300 may include network 330, IoT hub 351, IoT devices 341-343, gateway devices 311 and 312, and application back-end 313, which all connect to network 330. The term "IoT device" refers to a device intended to make use of IoT services. An IoT device can include virtually any device that connects to the cloud to use IoT services, including for telemetry collection or any other purpose. Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. Application back-end 313 could also be one or more virtual machines deployed in a public or private cloud. In some examples, at least some of the actions taken by the application back-end may be performed by applications running in application back-end 313. The term "IoT hub" refers to a device, or multiple devices such as a distributed system, to which, in some examples, IoT devices connect on the network for IoT services. In some examples, the IoT hub is excluded, and IoT devices communicate with application back-end 313, directly or through one or more intermediaries, without communicating with an IoT hub. Users of IoT devices receive IoT services via communication with the IoT service solution. The IoT solution service may be, in various examples, the IoT hub or the application back-end (e.g., the IoT solution service may be a software component in the application back-end). For instance, some examples include IoT hub 351 and IoT hub 351 acts as the IoT solution service. In other examples, IoT hub 351 is excluded from system 300, and application backend 313 acts as the IoT solution service.

Each of the IoT devices 341-343, gateway devices 311 and 312, and/or the devices that comprise IoT hub 351 and/or application back-end 313 may include examples of computing device 200 of FIG. 2. The term "IoT solution service" is not limited to one particular type of IoT service, but refers to the device to which the IoT device communicates, after provisioning, for at least one IoT solution or IoT service. That is, the term "IoT solution service," as used throughout the specification and the claims, is generic to any IoT solution. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a gateway device via a different network in network 330 than other IoT devices. In essence, network 330 includes any communication method by which information may travel between IoT hub 351, IoT devices 341-343, gateway devices 311 and 312, and application back-end 313. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341-343 are devices that are intended to make use of IoT services provided by the IoT solution service, which, in some examples, includes one or more IoT hubs, such as IoT hub 351. Application back-end 313 includes a device or multiple devices that perform actions in providing a device portal to users of IoT devices.

Optional gateway devices 311-312 are devices that may be used by some of the IoT devices 341-343 for accessing IoT hub 351. In some examples, after provisioning, some or all of the IoT devices 341-343 communicate to IoT hub 351 without using an intermediary. In other examples, some or all of the IoT devices 341-343 communicate with IoT hub 351 using an intermediary device such as one or more of gateway devices 311-312. Application back-end 313 is a service which may be used by users of IoT devices to manage IoT services for IoT devices including IoT device 341.

System 300 may include more or less devices than illustrated in FIG. 3, which is shown by way of example only.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4:
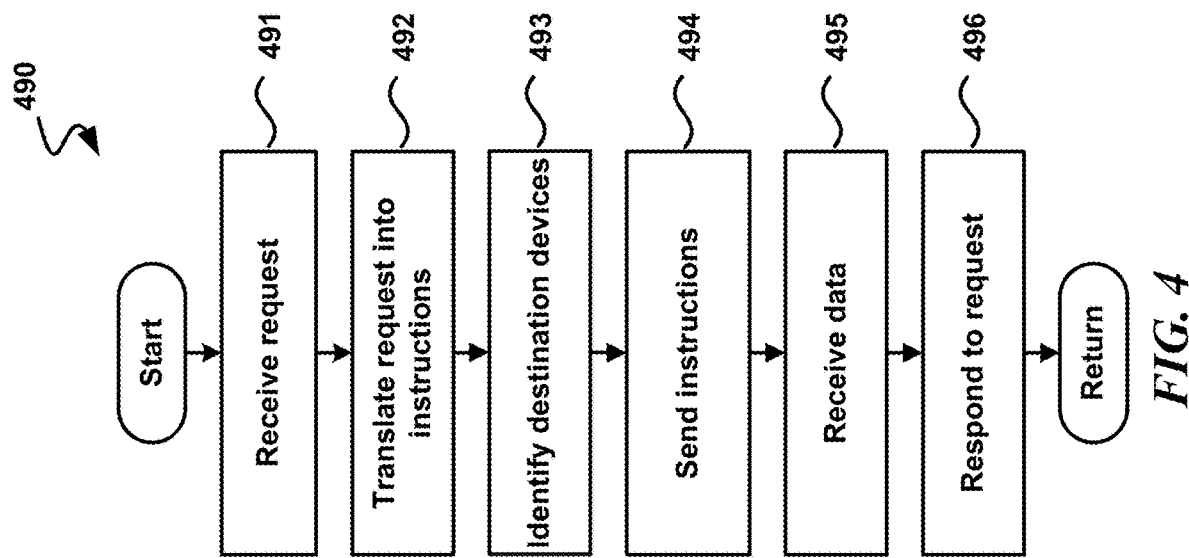
FIG. 4 is a diagram illustrating an example dataflow for a process for IoT data control.

FIG. 4 is a logical flow diagram illustrating an example of a process (490) for IoT authentication. Some examples of the process are performed by an IoT solution service, such as IoT hub 351 of FIG. 3, or a software component in application back-end 313 of FIG. 3. After a start block, the process proceeds to block 491. At block 491, a declarative telemetry request is received. The declarative telemetry request is a request for data from multiple IoT devices. Although a declarative telemetry request is specifically discussed, in some examples, other types of declarative IoT data requests can also be made. In some examples, the declarative telemetry request is sent to the IoT solution service from an application in the application back-end.

As examples of declarative IoT requests for illustrative purposes, one example declarative IoT telemetry request is a request to receive the torque values of all turbines in a power plant. Another example declarative IoT telemetry request is a request associated with obtaining data used for displaying a dashboard showing the average of the sum of output power produced in the power plant.

An application from the application back-end can make a declarative IoT data request as if all of the device telemetry and other IoT data is available and ready to be routed in response to a declarative IoT data request, and such that it appears to the application that no buffering, batching, or the like is required. The declarative IoT data request is a high-level declarative description of the IoT data being requested. The declarative request is a dynamic request in some examples. The declarative IoT data request need not specify how the request is answered, and in some examples the manner in which the request is answered is de-coupled from the request itself.

In some examples, the IoT device code does not require functional changes, the application back-end does not require different solution-specific code or alteration of functional design, and/or the like, depending on the type of IoT data being requested. Instead, the application back-end simply makes the request, de-coupled from the manner in which the request is answered. For instance, an example declarative telemetry request may be a request for the temperature in each room of a particular smart building, and the declarative telemetry requests need not take into account which manufactures the temperature sensors are from, even if the temperature sensors are from multiple different manufacturers, or have different firmware and/or software, different per-device sensor wiring, and/or the like. Further, the declarative telemetry request may be independent and/or agnostic of the particularities of the sensors. In other words, the declarative IoT data request may be made without knowing or enforcing any schema upon the device telemetry.

The type of declarative IoT request made at step 491 depends on the function(s) being performed by the application. Telemetry and other data from IoT devices may be requested for a variety of different purposes, including, for example, raw telemetry, special events, diagnostic telemetry, hot path analytics, alerts, and archival of telemetry data. In some examples, one or more declarative IoT requests may be made in order for an application to provide a visual dashboard of telemetry data, such as via graphs or the like.

The process then moves to block 492. At block 492, the declarative telemetry request is decomposed, converted, or otherwise translated into a plurality of individual instructions or individual sets of instructions. In some examples, the individual instructions or sets of instructions correspond to individual configurations for IoT devices. The individual configurations may include configurations of corresponding edge devices (e.g., IoT devices and/or intermediary devices) to configure the corresponding edge devices to send particular data to the IoT solution service at a particular frequency. The configurations may be coded to cause a device that executes the configuration to filter, buffer, compress, and/or send particular IoT data, including to send particular IoT data at a particular frequency.

Some configurations may vary based on one or more factors. For example, configurations may configure the devices to selectively send telemetry. Some configurations may vary the rate at which the data is sent, based on one or more factors, such as sending the data every five minutes if the device is on Wi-Fi, and every two hours otherwise. In some example, instead of only sending the data more frequently if the device is on Wi-Fi, the data may also be sent more frequently if the device is processing location information in any manner, including over Wi-Fi or over cellular. Some declarative IoT requests may result in the translated individual instructions requesting a different frequency of sending telemetry data than others. At step 492, the configurations may be generated so that the devices are configured to send the telemetry data to be used to suitably respond to the declarative IoT data requests and at the frequency necessary to suitably respond to the declarative IoT data requests.

The IoT solution service may take into account the connections between devices and gateways, as well as the capabilities of the devices for translating the declarative IoT data request into individual instructions or sets of instructions, in some examples. For example, some of the devices may be able to do buffering, some of the device might not be able to do buffering, and the declarative IoT data request is translated into individual instructions or sets of instructions accordingly.

The individual instructions or sets of instructions are optimized in some examples. For instance, in some examples, if one declarative request is for temperature every ten minutes, and another is for temperature and humidity every ten minutes, the IoT solution service can merge the requests and not request temperature twice. In some examples, part of the optimization may be achieved via hierarchical categories of IoT devices that is part of metadata stored in the IoT solution service for the IoT devices. That is, IoT devices may divided hierarchically into categories, which are further categorized into sub-categories, and so on, and these hierarchical categories may be taken into account in the optimization. The declarative IoT requests may be translated into instructions in a multi-level manner based on multiple hierarchical layers, in which the hierarchical categories to which IoT devices belong are updated automatically. In these examples, the stored metadata includes hierarchical categorization of the IoT devices, and the translating of the declarative IoT request into the individual instructions is based, in part, on the metadata.

The process then advances to block 493. At block 493, destination IoT devices associated with the plurality of individual instructions may be identified. In some examples, the devices that provide the data that is to be used to answer the request are identified at step 493. In one example, in order to respond to the declarative IoT data request, IoT data is obtained—e.g., IoT data that is or was collected by one or more IoT devices. In this example, the plurality of individual instructions are instructions used to obtain the IoT data from the IoT devices. Also, in this example, each individual instruction has an associated destination device to which the instruction is to be sent in order to obtain the IoT data. These destination devices are identified at step 493. In some examples, the determination at step 493 may be made based on metadata for the IoT devices stored in the IoT solution service. For example, a request may be made that requires gathering the temperature data from all temperature sensors in a particular smart building. In some examples, the IoT solution service includes metadata for the IoT devices that includes information about which devices are temperature sensors and which devices are in the particular smart building. This metadata may be used to assist in identifying the destination IoT devices at block 493. More information about particular example of the use of metadata, including device twins in some examples, for identifying destination IoT examples, is given in greater detail below.

The process then proceeds to block 494. At block 494, the instructions are sent to the destination IoT devices, i.e., to the individual or sets of instructions are sent to the destination devices identified at block 493 or to intermediary devices to which the destination IoT devices communicate the IoT data. In some examples, at block 494, the plurality of individual instructions is communicated such that the individual instructions are communicated to the edge devices that the individual instructions or sets of instructions correspond to. In some examples, some or all of the IoT devices are configurable, and the individual instructions or sets of instructions include configurations sent to the IoT devices themselves. In some examples, some or all of the IoT devices are not configurable, e.g. such IoT devices may send all telemetry data to an intermediary device which may be configurable. In such examples, and the individual instructions or sets of instructions may include configurations sent to the intermediary devices.

Although blocks 492-494 are shown as separate steps and in a particular order, in some examples, one or more the steps are block 492-494 may be performed in a different order than shown, or may be performed at the same time. For instance, in some examples, the instructions are decomposed while being propagated through the network.

In some examples, the intermediary devices are gateways such as field gateways that communicate with some of the IoT devices and with the IoT solution service, and the intermediary devices are configurable in response to the configurations that are sent at step 494. In some examples, the IoT devices send IoT data to the configurable intermediary device, and the configurable intermediary device is configured based on the configuration to filter, buffer, compress, and/or send particular IoT data to the IoT solution service, including to send particular IoT data to the IoT solution service at a particular configured frequency.

The process then moves to block 495. At block 495, telemetry data or other IoT data may be received from the destination IoT devices (via intermediary devices in some examples) based on the plurality of individual instructions. As previously discussed, in some examples, the individual instructions are configurations that may cause a device configured based on the configuration to filter, buffer, compress, and/or send particular IoT data, including to send particular IoT data at a particular configured frequency. The destination IoT devices may then send data based on the configuration, and the data sent by the destination IoT devices is received at block 495. In some examples, at block 495, IoT data is received from the corresponding edge devices upon the edge devices being configured based on execution of the configurations on the corresponding edge devices, and the corresponding edge devices sending IoT data in accordance with the executed configurations.

The process then proceeds to block 496. At block 496, the declarative telemetry request may be responded to by the IoT devices and/or intermediary devices based on the received telemetry data. In some examples, once the IoT data to be used to respond to the declarative IoT request is received, the IoT solution service then answers the request, based on the received IoT data, according to the particular IoT data request. The process may then advance to a return block, where other processing is resumed.

One example IoT device is a generator telematics unit that is capable of providing the following telemetry streams: engine hours, fuel consumption, engine temperature, engine fluid level/pressure, vehicle electrical power, electronic engine controller, and active diagnostic troubles codes. One example declarative IoT telemetry request is a request to send some of the telemetry streams to a large compressed file and to send the file to storage. Another example declarative IoT telemetry request is a request to send the telemetry streams for run hours, fuel, and oil temperature to a dashboard every five minutes. Another example declarative IoT telemetry request is a request to route all alerts based on the active diagnostic troubles codes to a critical queue.

Although not shown in FIG. 4, after step 496, in some examples, the configurations are updated. For instance, in some examples, after a device is de-provisioned, the configuration for the de-provisioned device is updated accordingly. If for example a device is moved from a first power plant to a second power plant, then the IoT solution service updates the configurations accordingly to reflect the change, and then sends the updated configurations. In some examples, the configurations are updated based on metadata stored in the IoT solution service for each device.

For instance, in some examples, if there are existing IoT telemetry requests to obtain the temperature readings for all temperature sensors in the first power plant, and a temperature sensor is moved from the first power plant to the second power plant, then the metadata for devices stored in the IoT solution service is updated, and a configuration is sent to the device (or to a corresponding intermediary device) to now send temperature data. In some examples, the IoT solution service has metadata for each device which defines categories or properties for each IoT device, with information such as location of the device and type of the device. In some examples, as previously discussed, these categories are hierarchical, and are automatically updated upon being applicable, such as upon a sensor being moved to a different building. In some examples, at least some of the metadata for each IoT device is synchronized with the corresponding IoT device itself.

In some examples, the metadata stored in the IoT solution service for the IoT devices is stored as in a logical "twins" of the devices. In these examples, the twins are the cloud representations of connected devices. In these examples, each twin has metadata regarding a corresponding IoT device. Each twin may include information about the corresponding device such as the type of device it is, and various properties of the device, including capabilities of the device and the configurations that the device has executed. For instance, one example twin may indicate that the corresponding device is an uninterruptable power supply, that the device has an associated IoT panel, and that the device has a battery level. At least a portion of the twin is synchronized with the corresponding IoT device in some examples. In some examples, the twins are queryable, and can be used in the answering of queries including declarative IoT requests.

For example, an IoT declarative telemetry request made be in a form such as, for example:

telemetryType="temp" AND
  $device.tags.building="B43" AND
  $device.tags.deviceType="tempSensor"
  BUFFER_UNTIL 5 m In this example, the twins are queryable, which may be used to assist the IoT solution service in determining which IoT devices have the tag "B43," which IoT devices have the tag "tempSensor."

Whether stored as twins or in some other manner, metadata that can be referred to in the telemetry requests about the device may be stored in the cloud, may be stored on the device, or in some combination thereof.

Figure 5:
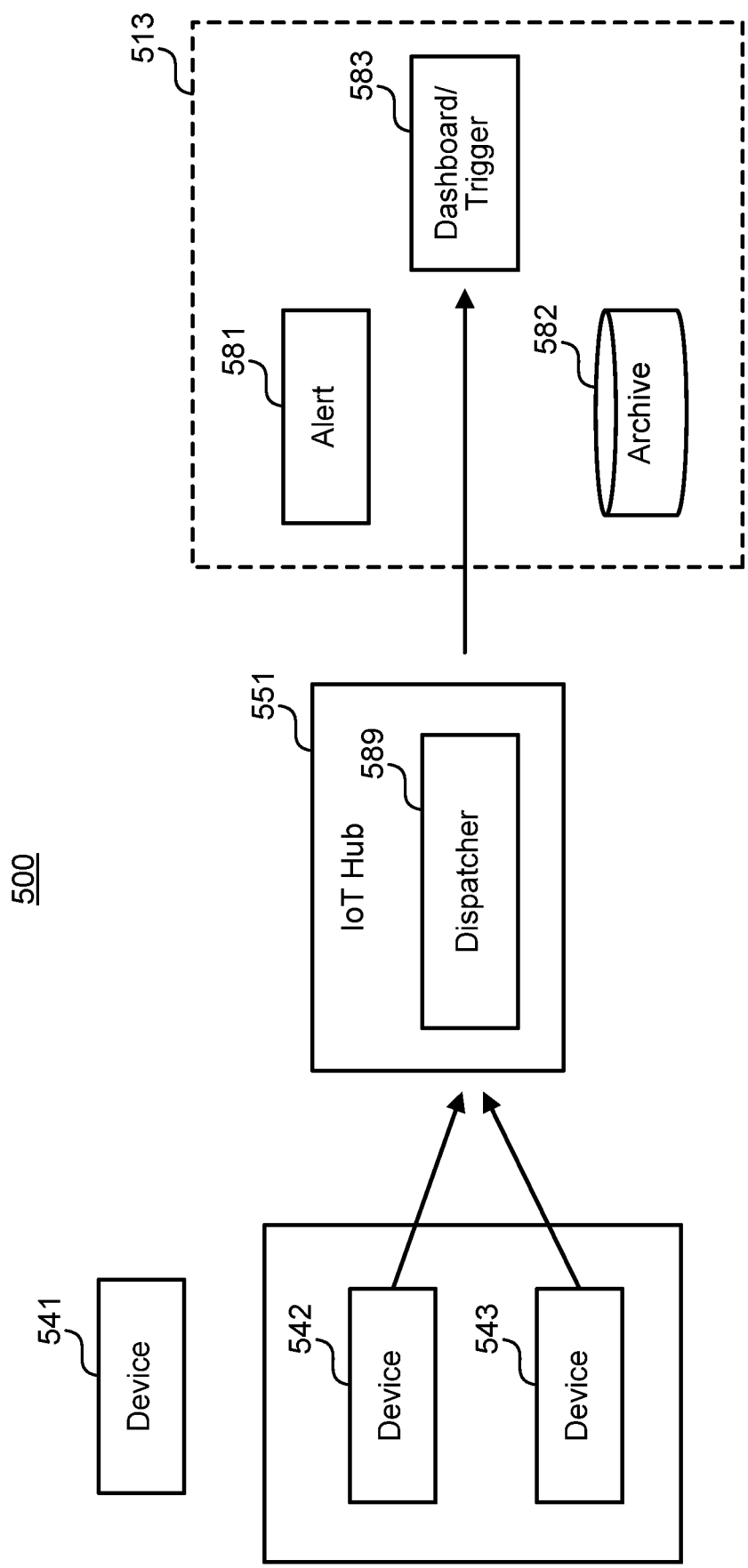
FIG. 5 is a block diagram illustrating an example of the system for IoT data control of FIG. 3, in accordance with aspects of the present disclosure.

FIG. 5 is a block diagram illustrating an example of system 400, which may be employed as an example of system 300 of FIG. 3. System 500 includes IoT devices 541-543, IoT hub 551, and application back-end 513. IoT hub 551 includes dispatcher 589. Application back-end 513 includes alert trigger component 581, archive component 582, and real-time dashboard and trigger rules component 583.

As shown in FIG. 5, an example IoT declarative telemetry request made be in a form such as, for example:

telemetryType="temp" AND
  $device.tags.building="B43" AND
  $device.tags.deviceType="tempSensor"
  BUFFER_UNTIL 5 m This example IoT declarative request can be decomposed into two parts:

The set of devices that are to be requested to send telemetry in order to respond to the request:

$device.tags.building="B43" AND
  $device.tags.deviceType="tempSensor", and

The configuration of which telemetry to send:

telemetryType="temp" BUFFER_UNTIL 5 m

Instead of assuming that devices send all messages to the cloud and the IoT solution service filters this immutable stream, the IoT solution service can use the same filter expression and configure the devices to only send the determined telemetry.

The combination of filtering on both message properties and twin properties may result in a very powerful language that allows solving real world scenarios such as a wireless device that is configured to send telemetry every 5 minutes if it is on Wi-Fi, every hour if on a metered connection, and a device that sends logs every 24 hours, but immediately if there is a critical error.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. A first edge device comprising:
 a memory having processor-executable code stored therein; and
 at least one processor that is adapted to execute the processor-executable code, the processor-executable code including processor-executable instructions that, in response to execution, enable the first edge device to perform actions, including:
  receiving a first individual configuration comprising first instructions specific to the first edge device, wherein the first individual configuration and a second individual configuration are decomposed from a declarative telemetry request for data from multiple edge devices including the first edge device and a second edge device, the second individual configuration comprising second instructions that are specific to the second edge device and different from the first instructions, the first edge device and the second device being different in at least one of: device make, device model, or device version;
  reconfiguring the first edge device by executing the first individual configuration; and
  after reconfiguring the first edge device, providing telemetry data in accordance with the first individual configuration, the telemetry data enabling a response to the declarative telemetry request.

2. The first edge device of claim 1, the actions further including: receiving an updated individual configuration.

3. The first edge device of claim 1, wherein the first individual configuration is coded to cause the first edge device to send telemetry data at a configured frequency.

4. The first edge device of claim 1, wherein the declarative telemetry request is decomposed based, in part, on stored metadata that is related to the multiple edge devices.

5. The first edge device of claim 4, wherein the stored metadata includes hierarchical categorization of the multiple edge devices.

6. The first edge device of claim 5, wherein the stored metadata includes device twins, wherein the device twins correspond to the multiple edge devices, and wherein a portion of each device twin is synchronized with a corresponding edge device of the multiple edge devices such that the hierarchical categorization of the multiple edge devices is updated automatically based on changes to the hierarchical categorization.

7. The first edge device of 6, further comprising:
 receiving updated individual configurations that are based on the automatic updating of the hierarchical categorization.

8. A method, comprising:
 receiving, at a first edge device, a first individual configuration specific to the first edge device, wherein the first individual configuration and a second individual configuration are decomposed from a declarative telemetry request for data from multiple edge devices including the first edge device and a second edge device, the second individual configuration being specific to the second edge device, the first edge device and the second device being different in at least one of hardware or software;

configuring the first edge device by executing the first individual configuration; and after reconfiguring the first edge device, providing telemetry data from the first edge device in accordance with the first individual configuration, the telemetry data being used in a response to the declarative telemetry request.

9. The method of claim 8, further comprising: receiving an updated individual configuration.

10. The method of claim 8, wherein first individual configuration is coded to cause the first edge device to send telemetry data at a configured frequency.

11. The method of claim 8, wherein the plurality of individual configurations are decomposed from the declarative telemetry request based, in part, on stored metadata that is related to the multiple edge devices.

12. The method of claim 11, wherein the stored metadata includes hierarchical categorization of the multiple edge devices.

13. The method of claim 12, wherein the stored metadata includes device twins, wherein the device twins correspond to the multiple edge devices, and wherein a portion of each device twin is synchronized with the corresponding edge device of the multiple edge devices such that the hierarchical categorization of the multiple edge devices is updated automatically based on changes to the hierarchical categorization.

14. The method of claim 13, further comprising:
receiving updated individual configurations that are based on the automatic updating of the hierarchical categorization.

15. A processor-readable storage medium, having stored thereon processor-executable code, that, upon execution by at least one processor, enables actions, comprising:
receiving a first individual configuration comprising first instructions specific to a first edge device, wherein the first individual configuration and a second individual configuration are decomposed from a declarative telemetry request for data from multiple edge devices including the first edge device and a second edge device, the second individual configuration comprising second instructions that are specific to the second edge device and different from the first instructions, the declarative telemetry request resulting in decomposition of a plurality of individual configurations based on a hierarchical categorization of the multiple edge devices, the first edge device and the second device being different in at least one of hardware or software;

reconfiguring the first edge device by executing the first individual configuration; and after reconfiguring the first edge device, providing telemetry data in accordance with the first individual configuration, the telemetry data enabling a response to the declarative telemetry request.

16. The processor-readable storage medium of claim 15, the actions further including: receiving an updated individual configuration.

17. The processor-readable storage medium of claim 15, wherein reconfiguring the first edge device by executing the first individual configuration causes the first edge device to send the telemetry data at a configured frequency.

18. The processor-readable storage medium of claim 15, wherein the plurality of individual configurations are decomposed from the declarative telemetry request based, in part, on stored metadata that is related to the multiple edge devices, the stored metadata includes the hierarchical categorization of the multiple edge devices, the stored metadata includes device twins, the device twins correspond to the multiple edge devices, and wherein a portion of each device twin is synchronized with the corresponding edge device of the multiple edge devices such that the hierarchical categorization of the multiple edge devices is updated automatically based on changes to the hierarchical categorization.

19. The processor-readable storage medium of claim 15, wherein the stored metadata includes hierarchical categorization of the multiple edge devices.

20. The processor-readable storage medium of claim 15, wherein the declarative telemetry request does not enforce a schema upon the telemetry data.

* * * * *